(12) United States Patent
Williams

(10) Patent No.: US 10,731,790 B1
(45) Date of Patent: Aug. 4, 2020

(54) MODULAR INTEGRATED MOUNTING SYSTEM

(71) Applicant: U.S. Government as Represented by the Secretary of the Army, Natick, MA (US)

(72) Inventor: Benjamin S. Williams, East Walpole, MA (US)

(73) Assignee: U.S. Government as Represented by the Secretary of the Army, Washington, DC (US)

( * ) Notice: Subject to any disclaimer, the term of this patent is extended or adjusted under 35 U.S.C. 154(b) by 75 days.

(21) Appl. No.: 16/137,814

(22) Filed: Sep. 21, 2018

Related U.S. Application Data

(60) Provisional application No. 62/561,219, filed on Sep. 21, 2017.

(51) Int. Cl.
- *B63B 25/28* (2006.01)
- *F16M 11/42* (2006.01)
- *F16M 13/02* (2006.01)

(52) U.S. Cl.
CPC ........ *F16M 11/425* (2013.01); *F16M 13/022* (2013.01); *B63B 25/28* (2013.01)

(58) Field of Classification Search
CPC .......... B60P 7/15; B60P 7/08; B64D 11/0696; B64D 9/003; B61D 45/001; B62B 2301/05; B64C 1/20
See application file for complete search history.

(56) References Cited

U.S. PATENT DOCUMENTS

| | | | | | |
|---|---|---|---|---|---|
| 3,051,099 | A | * | 8/1962 | Robertson | B60P 7/15 410/102 |
| 3,262,588 | A | * | 7/1966 | Davidson | B60P 1/52 414/536 |
| 4,237,794 | A | * | 12/1980 | Biaggini | B60P 3/073 24/631 |
| 4,457,649 | A | * | 7/1984 | Vogg | B64D 9/003 244/118.1 |
| 5,234,297 | A | * | 8/1993 | Wieck | B64D 9/003 244/118.1 |
| 6,302,358 | B1 | * | 10/2001 | Emsters | B64C 1/20 244/137.1 |
| 6,517,028 | B2 | * | 2/2003 | Huber | B64D 9/00 244/118.1 |
| 8,172,195 | B2 | * | 5/2012 | Fanucci | B63B 29/06 248/429 |
| 8,690,503 | B2 | * | 4/2014 | Chamoun | B60P 7/15 410/121 |
| 9,174,748 | B2 | * | 11/2015 | Umlauft | B64C 1/20 |
| 9,896,185 | B2 | * | 2/2018 | Cullen | B64C 1/20 |
| 2018/0073676 | A1 | * | 3/2018 | Schroeder | F16M 13/02 |
| 2018/0290724 | A1 | * | 10/2018 | Nowarre | B64C 1/20 |
| 2018/0327097 | A1 | * | 11/2018 | Loose | B64D 11/0696 |
| 2018/0334077 | A1 | * | 11/2018 | Suppinger | B21D 47/00 |

* cited by examiner

*Primary Examiner* — Bradley Duckworth
(74) *Attorney, Agent, or Firm* — Roger C Phillips

(57) ABSTRACT

A modular integrated mounting system includes a plurality of mounting struts secured to a floor or deck surface, at least one cross mounting rail movably attached perpendicular to the mounting struts, a foot lock receiver attached to the at least one cross mounting rail, and a foot lock configured to be attached to equipment and to be retained by the foot lock receiver.

13 Claims, 10 Drawing Sheets

MODULAR INTEGRATED MOUNTING SYSTEM

FIELD

The disclosed embodiments relate generally to an equipment mounting system, and more particularly, to a system that facilitates equipment movement and replacement.

BACKGROUND

A significant amount of equipment requires semi-permanent or permanent mounting to prevent movement resulting from external sources. For example, shipboard mounted equipment may have to be rigidly mounted to withstand various forces while underway. In particular, Navy ships may require equipment to be permanently mounted to the steel deck, for example by welding, with various floor coverings such as terrazzo or quarry tile laid on top of the steel deck and equipment footings. Current mounting systems may make equipment servicing and changeover extremely difficult, resulting in increased man-hours, cost of materials, and time spent out of service.

SUMMARY

The disclosed embodiments are directed to a modular integrated mounting system including a plurality of mounting struts secured to a floor or deck surface, at least one cross mounting rail movably attached perpendicular to the mounting struts, a foot lock receiver attached to the at least one cross mounting rail, and a foot lock configured to be attached to equipment and to be retained by the foot lock receiver.

The disclosed embodiments are further directed to a method of mounting equipment including securing a plurality of mounting struts to a floor or deck surface, movably attaching at least one cross mounting rail perpendicular to the mounting struts, attaching a foot lock receiver to the at least one cross mounting rail, and attaching a foot lock to equipment being mounted, and retaining the foot lock by the foot lock receiver.

These and other aspects, objects, and features of the present disclosure will be understood and appreciated by those skilled in the art upon studying the following specification, claims, and appended drawings. It will also be understood that features of each example disclosed herein may be used in conjunction with, or as a replacement for, features of the other examples.

BRIEF DESCRIPTION OF THE DRAWINGS

The foregoing aspects and other features of the embodiments are explained in the following description, taken in connection with the accompanying drawings, wherein.

DETAILED DESCRIPTION

Figure 1:
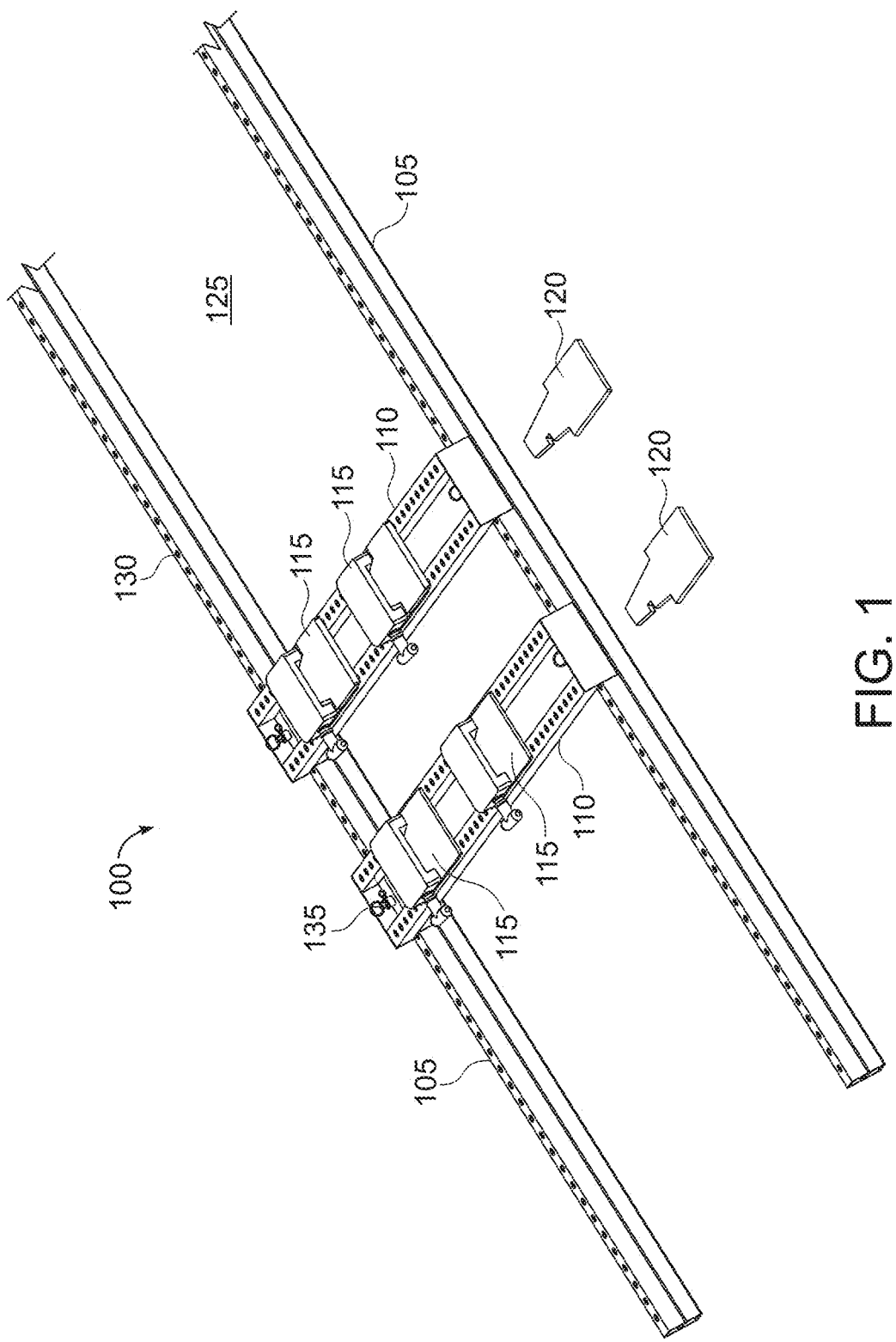
FIG. 1 shows an exemplary embodiment of the modular integrated mounting system.

Before describing in detail embodiments that are in accordance with the present invention, it should be observed that the embodiments reside primarily in combinations of method steps and apparatus components related to an integrated mounting system that facilitates equipment movement and replacement. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceeded by "comprises . . . a" does not, without more constraints, preclude the existence of additional identical elements in the process, method, article, or apparatus that comprises the element.

The disclosed modular integrated mounting system is generally designed to reduce the cost, complexity, time, and tools required to reposition, move, or replace permanently or semi-permanently mounted equipment, while providing a mounting platform that provides the same stability as the permanent or semi-permanent mounting. In at least one embodiment, the modular integrated mounting system includes one or more foot locks attached to the equipment to be mounted, a rail system mounted to a deck or floor surface, and one or more foot lock receivers mounted to the rail system for retaining the foot locks.

FIG. 1 shows an exemplary embodiment of the modular integrated mounting system 100. The modular integrated mounting system 100 includes one or more mounting struts 105, one or more cross mounting rails 110, one or more foot lock receivers 115, and one or more foot locks 120.

The one or more mounting struts 105 may be rigidly mounted to a deck or floor surface 125, for example, by welding when the deck is a metal surface. The mounting struts 105 may be mounted parallel in relation to the front and back surfaces of the equipment utilizing the mounting system 100. The mounting struts 105 may include one or more through holes 130 that may be spaced along the lengths of the mounting struts 105 and may be configured to accept fasteners 135. For purposes of the disclosed embodiments, the fasteners 135 may include quick release lock pins, bolts, or any suitable fasteners.

Figure 2:
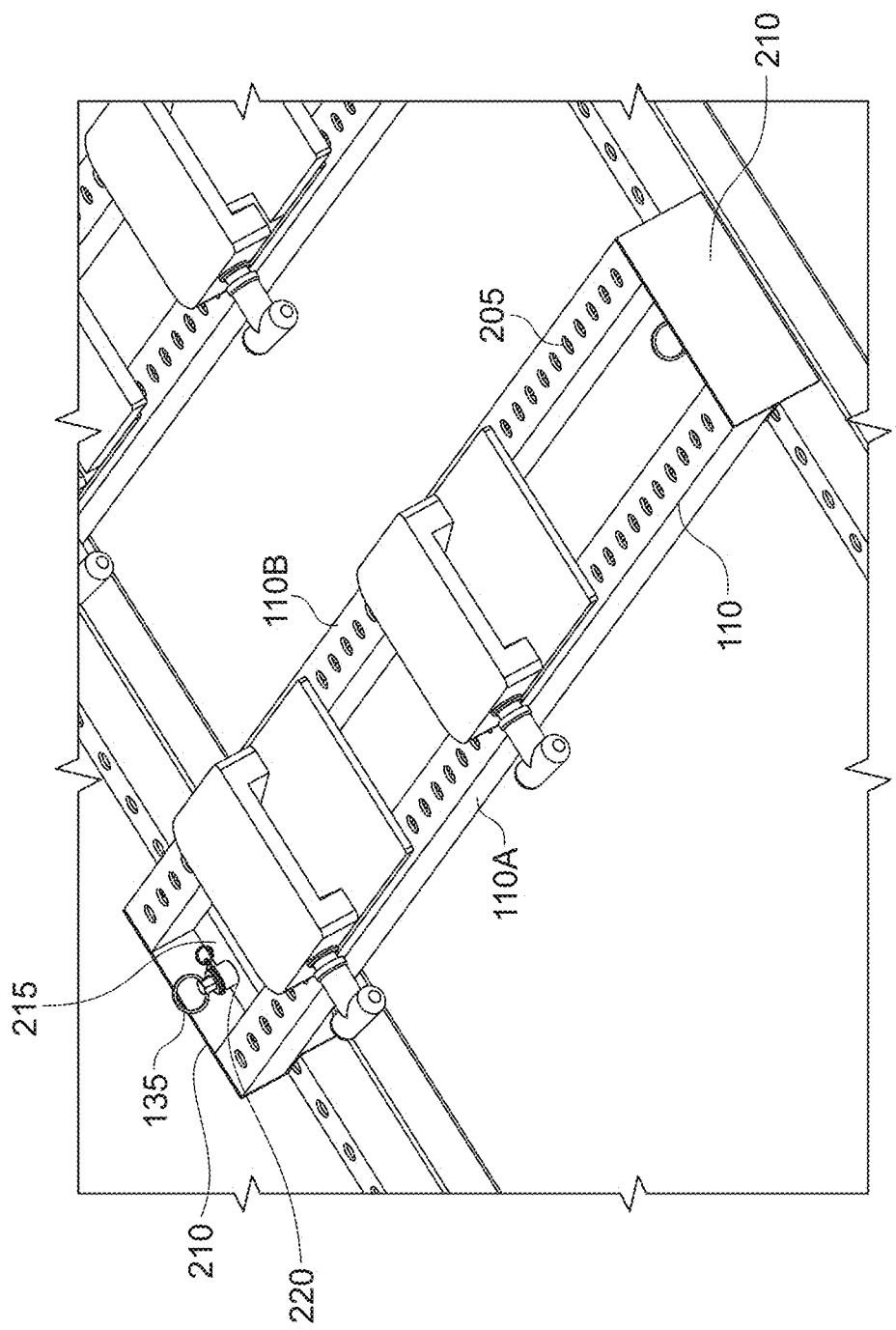
FIG. 2 shows an enlarged view of a cross mounting rail.

FIG. 2 shows an enlarged view of a cross mounting rail 110. The cross mounting rail 110 may mounted perpendicular to the mounting struts 105 and may also include one or more through holes 205 that may be spaced along the lengths of the cross mounting rails 110, and may be configured to accept fasteners 135. In some embodiments, the cross mounting rails 110 may each be configured as a pair of sub rails 110A, 110B with ends connected by strut caps 210. Each strut cap 210 may include a bottom section 215 that overlaps the corresponding mounting strut 105 and has a through hole 220. The cross mounting rail may be attached to the corresponding mounting strut 105 by a fastener 135 that extends through the through hole 220 into a corresponding through hole 130 of the mounting strut 105. The fasteners 135 and through holes 220 and 130 allow for adjustable spacing between the cross mounting rails 110 to accommodate different equipment spacing and different equipment widths.

Figure 3:
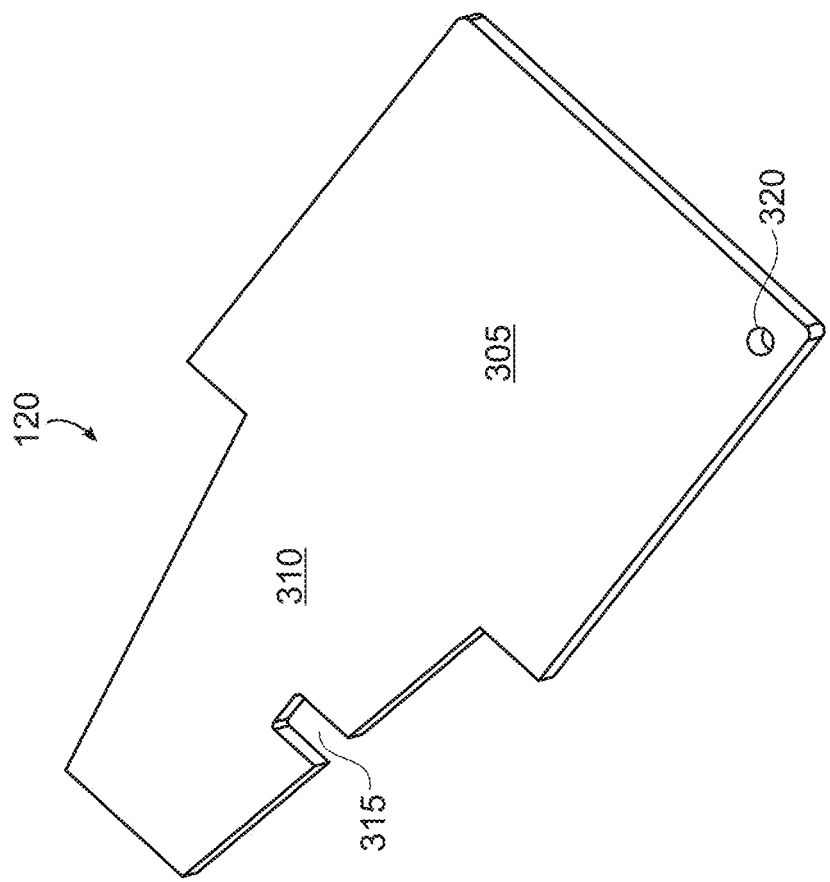
FIG. 3 illustrates an exemplary foot lock according to the disclosed embodiments.

FIG. 3 illustrates an exemplary foot lock 120 according to the disclosed embodiments. In use, the foot lock 120 is rigidly attached, for example, by bolting or welding, to one or more feet or other underside support of the equipment to be mounted. The foot lock 120 is generally one piece and includes a first section 305 to be attached to the equipment and a second section 310 to be captured by the foot lock receivers 115 described below. The second section 310 may be tapered to closely fit in the foot lock receiver 115 and may include a notch 315 to receive a shaft described below to retain the foot lock 120 in the foot lock receiver 115. The foot lock 120 may have a through hole 320 sized to accept a fastener with an increased load capacity for securing the foot lock 120 to the foot lock receiver 115 and to the cross mounting rail 110.

FIGS. 4A-4D show an exemplary foot lock receiver 115. The foot lock receiver 115 may include a housing 405 rigidly attached to a base 410, for example by welding, and a spring loaded retaining assembly 415. The housing 405 and base 410 may have corresponding though holes 420 through which fasteners 135 may extend to locate the foot lock receiver 115 with respect to the through holes 205 in the cross mounting rails 110. Certain through holes 425 may be sized to accept fasteners having an increased load capacity for securing the foot lock receiver to the corresponding cross mounting rail 110 under increased load conditions.

Figure 4B:
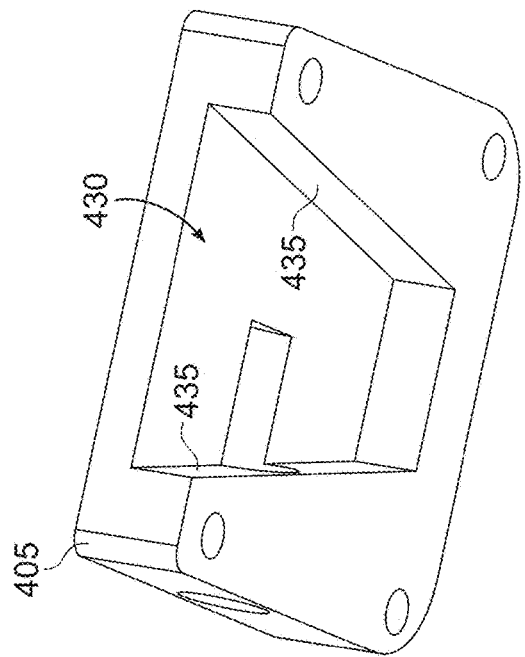
FIGS. 4A-4D show an exemplary foot lock receiver.

A bottom view of the housing 405 is shown in FIG. 4B. The housing 405 has an opening 430 for receiving the second section 310 of the foot lock 120, and tapered interior sides 435 corresponding to the tapered second section 310 of the foot lock 120 to closely fit and prevent excessive movement of the foot lock 120.

Figure 4C:
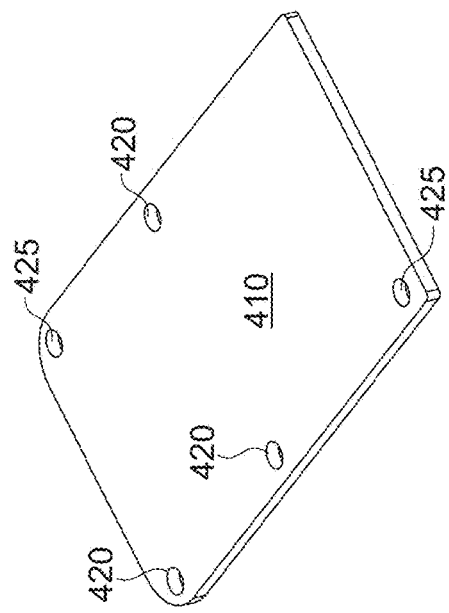
Figure 4A:
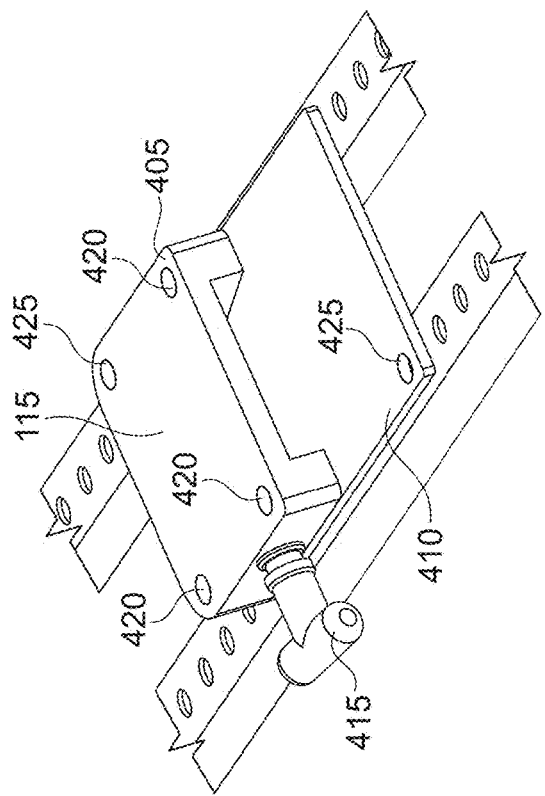

FIG. 4C shows the base 410 of in the foot lock receiver 115. Similar to the housing 405, the base 410 may have corresponding though holes 420 through which fasteners 135 may extend to locate the foot lock receiver 115 with respect to the through holes 205 in the cross mounting rails 110. Certain through holes 425 may be sized to accept fasteners having an increased load capacity for securing the foot lock receiver to the corresponding cross mounting rail 110 under increased load conditions.

Figure 4D:
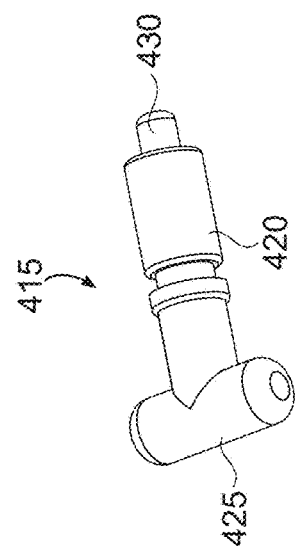

FIG. 4D shows an exemplary spring loaded retaining assembly 415 for retaining the foot lock 120 within the foot lock receiver 115. The spring loaded retaining assembly 415 may include a shaft 420 that extends through the housing 405 and into the notch 315 of the foot lock 120 when the foot lock 120 is inserted into the foot lock receiver 115. A handle 425 may be attached to the shaft 420. The spring loaded retaining assembly 415 may be spring biased to pull the shaft 420 inward to engage the notch 315 of the foot lock 120 and the handle 425 may provide a grip for manipulating the spring loaded retaining assembly 415. The spring loaded retaining assembly 415 may include a locking mechanism that retains the shaft 420 such that an end 430 of the shaft 420 is maintained clear of the notch 315 to disengage the foot lock 120 from the foot lock receiver 115. For example, the handle 425 may be pulled outward and rotated to engage the locking mechanism and release the foot lock 120.

Figure 5:
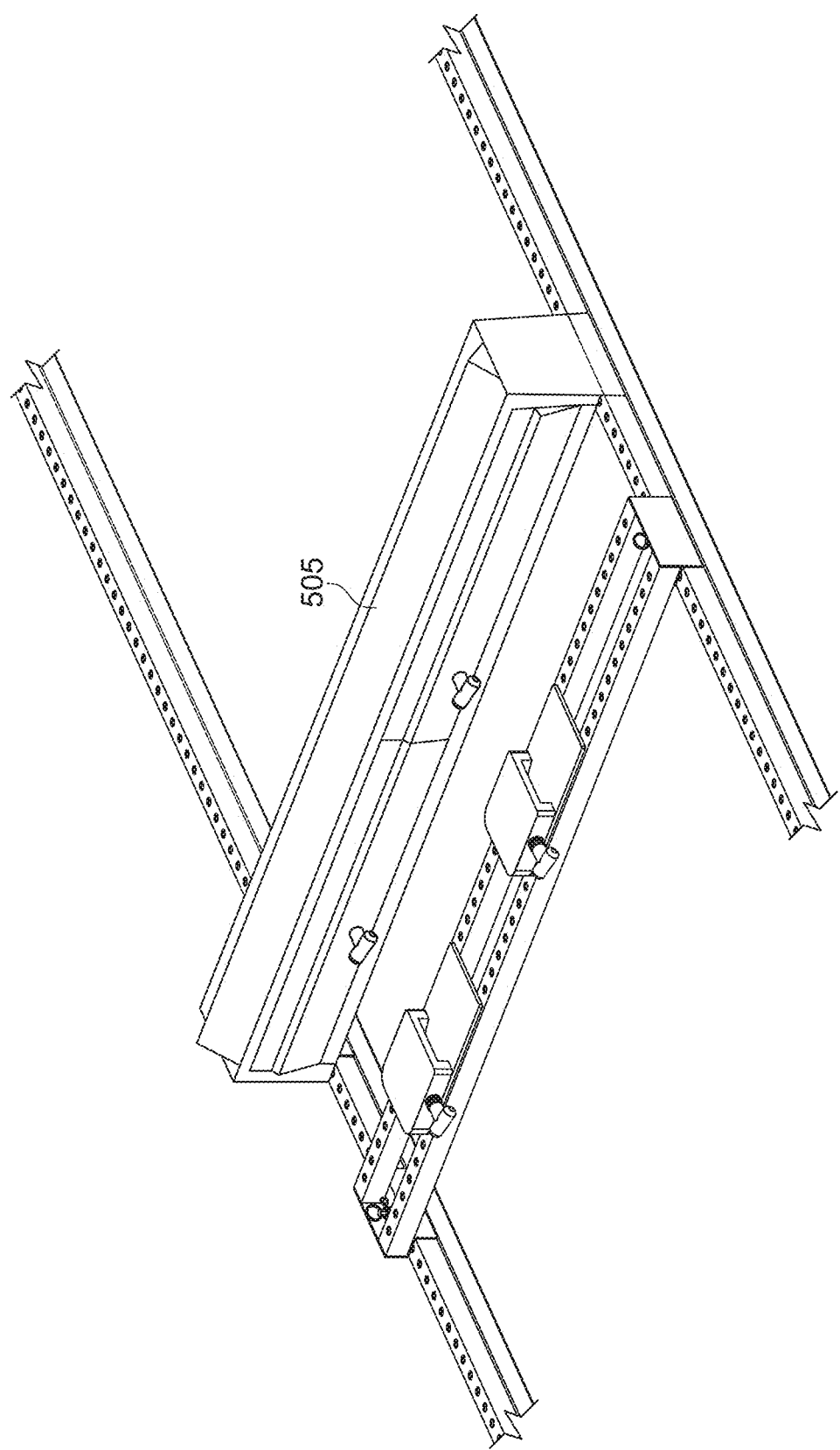
FIG. 5 depicts an assembled example of the modular integrated mounting system with an optional cover.

FIG. 5 depicts an assembled example of the modular integrated mounting system 100 with an optional cover 505 which may be utilized to cover the cross mounting rails 110.

The modular integrated mounting system 100 thus advantageously facilitates installation, removal, replacement, and reconfiguration of the mounted equipment. Once the mounting struts 105 are installed, the cross mounting rails 110 may be spaced apart to accommodate different dimensional widths of each piece of equipment and spacing between different pieces of equipment which are mounted to the same set of mounting struts 105. The cross mounting rails 110 are then fastened to the mounting struts 105. The foot lock receivers 115 may be positioned on the cross mounting rails 110 to accommodate for the various dimensional depths of feet on the equipment which are attached to the foot locks 120. The equipment may then be installed by simply sliding the attached foot locks 120 into the foot lock receivers 115. The foot locks 120 are automatically locked into place via the spring loaded retaining assembly 415. The equipment may be removed by using the handles 425 to release the foot locks 120; allowing the equipment to be pulled away.

Figure 6:
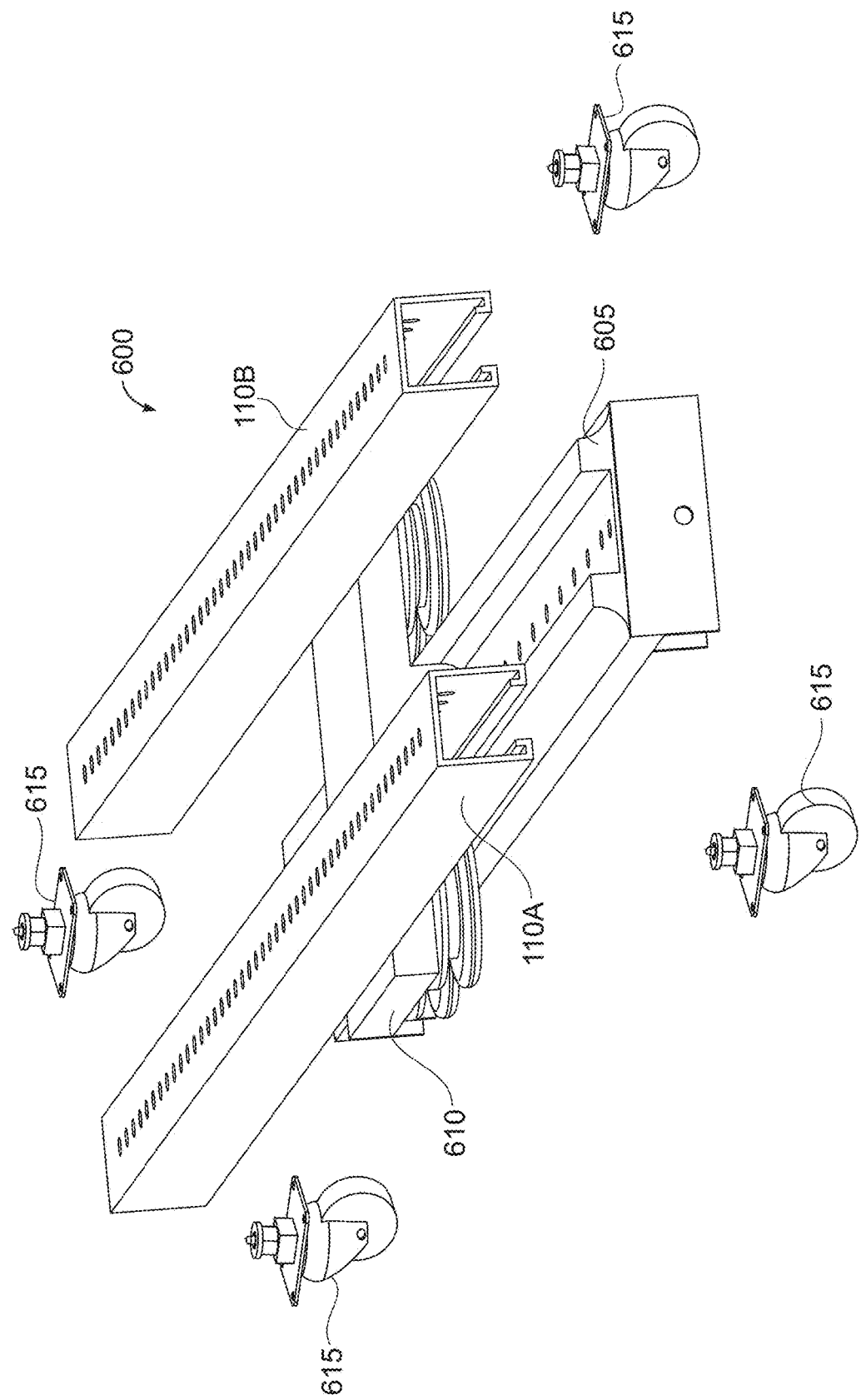
FIG. 6 shows an embodiment that includes an optional roller assembly to facilitate equipment movement.

FIG. 6 shows an embodiment that includes an optional roller assembly 600 to facilitate equipment movement. The roller assembly 600 may include a roller supporting rail 605, a roller carriage 610, a set of wheels 615, and a set of portable ramps 620 described below. In embodiments utilizing the roller assembly 600, the roller supporting rail 605 is attached to the mounting struts 105 and the cross mounting rails 110 are attached to the roller carriage 610 instead of the mounting struts 105. The cross mounting rails 110 may be rigidly attached to the roller carriage, for example, by bolting, pinning, or welding. The roller supporting rail 605 may be positioned between and parallel to the sub rails 110A, 110B, and may extend between the mounting struts 105.

Figure 7:
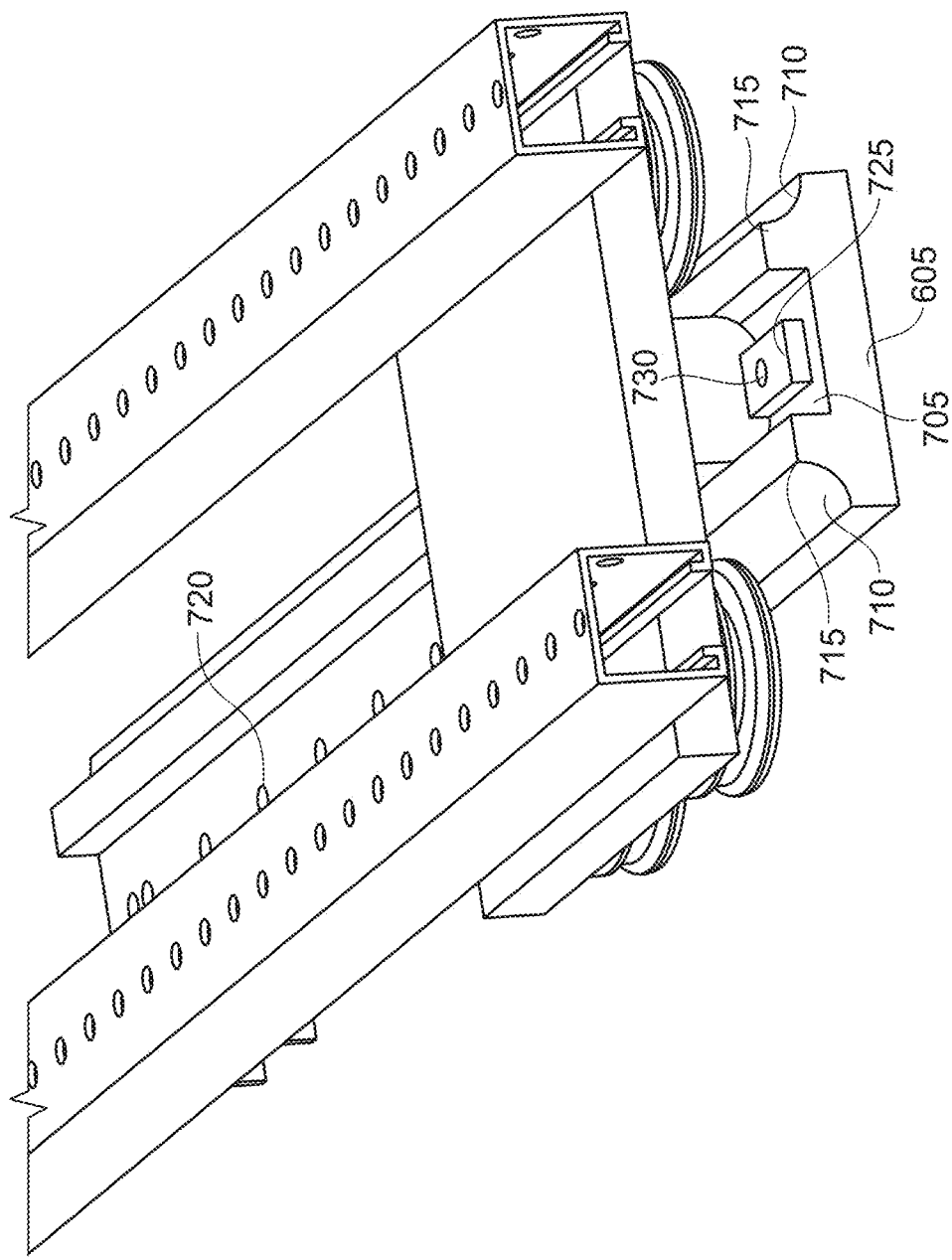
FIG. 7 shows features of a roller supporting rail of the optional roller assembly.

As shown in FIG. 7, the roller supporting rail 605 may include a center channel 705 positioned between opposing curved walls 710 that form lips 715. The center channel 705 may include one or more through holes 720 that may be spaced along the length of the roller supporting rail 605 and may be configured to accept fasteners. The roller carriage 610 may include one or more tabs 725 on opposite ends of the roller carriage 610 with through holes 730 and may be rigidly attached to the roller supporting rail 605 using fasteners that extend through the through holes 730 into corresponding through holes 720 of the roller supporting rail 605. The roller supporting rail 605 may be attached to the mounting struts 105 using fasteners 135, for example, pins that extend through the through holes 720 into corresponding through holes 130 of the mounting struts 105.

Figure 8:
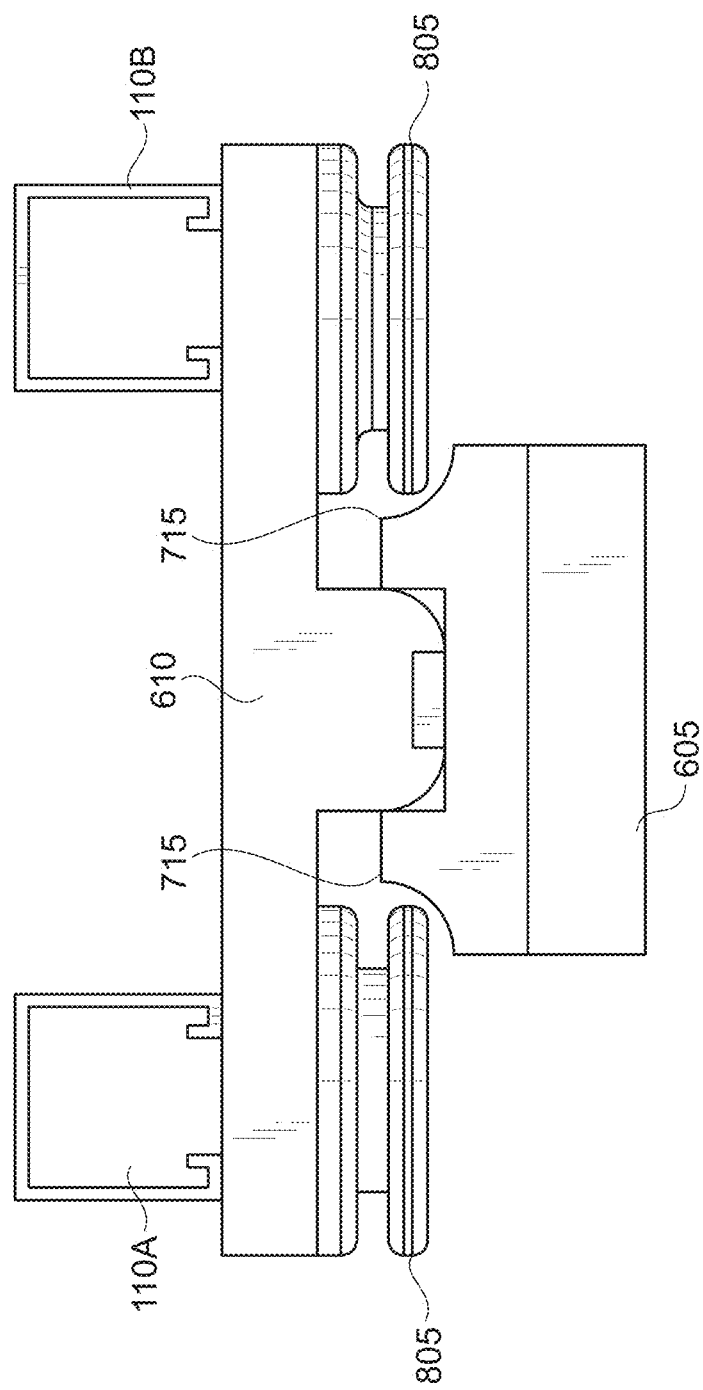
FIG. 8 shows a cross section of a roller carriage mounted on the roller supporting rail.

FIG. 8 shows a cross section of the roller carriage 610 attached to the sub rails 110A, 110B and mounted on the roller supporting rail 605 with rollers 805 that may be captured by the lips 715 of the roller support rail 605.

Figure 9:
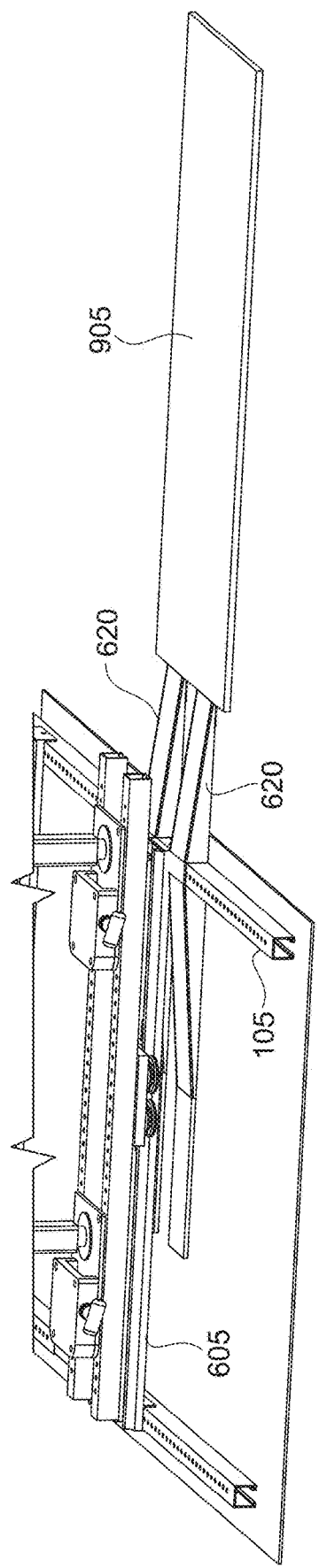
FIG. 9 shows an example of the modular integrated mounting system with portable ramps.
Figure 10:
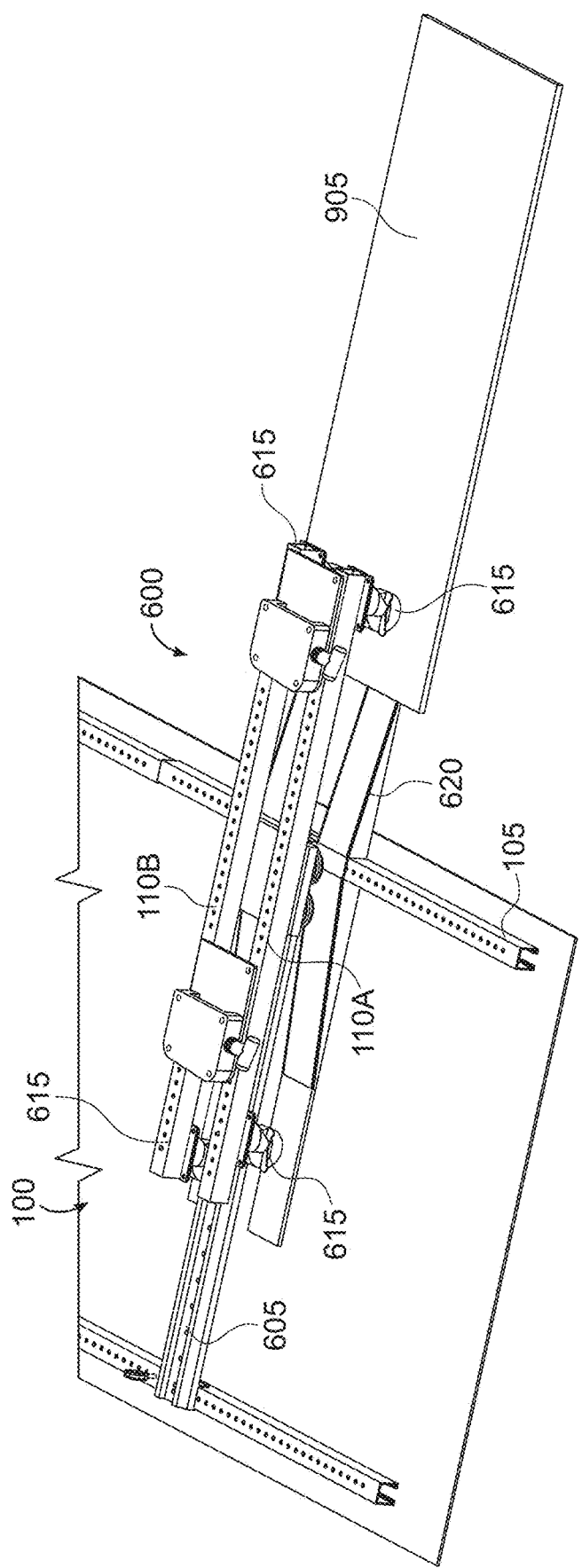
FIG. 10 shows an example of the modular integrated mounting system with the optional roller assembly in use.

FIG. 9 shows the modular integrated mounting system 100 with the portable ramps 620. The portable ramps 620 may be positioned on either side of the roller supporting rail 605 over the mounting strut 105 to further facilitate movement of the equipment. An optional floor plate 905 may be included to protect the deck or floor surface FIG. 10 depicts an example of the modular integrated mounting system 100 with the optional roller assembly 600 in use. Wheels 615 are attached to ends of the sub rails 110A, 1108, ramps 620 are positioned on opposite sides of the roller supporting rail 605 in line with the wheels 615, the floor plate 905 may be positioned at the ends of the ramps 620, and the fasteners are removed from the tabs 725 of the roller carriage 610. As the equipment is pulled along the length of the roller supporting rail 605, the roller carriage 610 disengages from the roller supporting rail 605, allowing the wheels 615 to support the weight of the equipment, contact the ramps 620 and roll over the mounting strut 105 and optionally onto the floor plate 905 if the floor plate is being used. Otherwise the wheels roll over the mounting strut 105 on the ramp and onto the deck. It should be understood that this procedure may be implemented in reverse order to install equipment.

The optional roller assembly 600 thus provides further advantages when installing, removing, replacing, and reconfiguring the mounted equipment by providing the ability to roll the equipment from location to location without separate material handling equipment.

It should be understood that the mounting struts 105, cross mounting rails 110, fasteners 130, 350, 535, roller support rail 505, roller carriage 510, foot locks 210, and foot lock receivers 305 may be fabricated from a rigid material that may be corrosion resistant or may be treated with a corrosion resistant coating It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

Various modifications and adaptations may become apparent to those skilled in the relevant arts in view of the foregoing description, when read in conjunction with the accompanying drawings. However, all such and similar modifications of the teachings of the disclosed embodiments will still fall within the scope of the disclosed embodiments.

Various features of the different embodiments described herein are interchangeable, one with the other. The various described features, as well as any known equivalents can be mixed and matched to construct additional embodiments and techniques in accordance with the principles of this disclosure.

Furthermore, some of the features of the exemplary embodiments could be used to advantage without the corresponding use of other features. As such, the foregoing description should be considered as merely illustrative of the principles of the disclosed embodiments and not in limitation thereof.

The invention claimed is:

1. A modular integrated mounting system comprising:
a plurality of mounting struts secured to a floor or deck surface;
at least one cross mounting rail movably attached perpendicular to the mounting struts;
a foot lock receiver attached to the at least one cross mounting rail; and
a foot lock configured to be attached to equipment and to be retained by the foot lock receiver, wherein the foot lock receiver comprises a housing through which a spring loaded retaining assembly extends.

2. The modular integrated mounting system of claim 1, wherein the at least one cross mounting rail comprises sub rails with ends connected by strut caps.

3. The modular integrated mounting system of claim 2, wherein the at least one cross mounting rail is attached to the mounting struts by fasteners extending through through holes of the strut caps into corresponding through holes in the mounting struts.

4. The modular integrated mounting system of claim 1, wherein the housing comprises a tapered interior to closely fit and prevent excessive movement of the foot lock.

5. The modular integrated mounting system of claim 1, wherein the spring loaded retaining assembly comprises a shaft that extends through the housing to capture a notch of the foot lock when the foot lock is inserted into the foot lock receiver.

6. The modular integrated mounting system of claim 1, comprising a roller assembly interposed between the plurality of mounting struts and the at least one cross mounting rail.

7. The modular integrated mounting system of claim 6, wherein the roller assembly comprises:
a roller supporting rail attached to the plurality of mounting struts;
a roller carriage mounted to the roller supporting rail and attached to the at least one cross mounting rail;
wheels configured to be attached to sub rails of the at least one cross mounting rail; and
ramps configured to allow the roller assembly to traverse at least one of the plurality of mounting struts.

8. A method of mounting equipment comprising:
securing a plurality of mounting struts to a floor or deck surface;
movably attaching at least one cross mounting rail perpendicular to the mounting struts;
attaching a foot lock receiver to the at least one cross mounting rail; and
attaching a foot lock to equipment being mounted, and retaining the foot lock by the foot lock receiver, wherein retaining the foot lock by the foot lock receiver comprises extending a shaft of a spring loaded retaining assembly through a housing of the foot lock receiver into which the foot lock is inserted.

9. The method of claim 8, comprising connecting ends of sub rails of the at least one cross mounting rail with strut caps.

10. The method of claim 9, comprising attaching the at least one cross mounting rail to mounting struts by fasteners extending through through holes of the strut caps into corresponding through holes in the mounting struts.

11. The method of claim 8, wherein the housing comprises a tapered interior to closely fit and prevent excessive movement of the foot lock.

12. The method of claim 8, comprising interposing a roller assembly between the plurality of mounting struts and the at least one cross mounting rail.

13. The method of claim 12, comprising:
attaching a roller supporting rail to the plurality of mounting struts;
mounting a roller carriage to the roller supporting rail;
attaching the roller carriage to the at least one cross mounting rail;
attaching wheels to sub rails of the at least one cross mounting rail;
overlaying ramps over at least one of the plurality of mounting struts; and rolling equipment attached to the foot lock over at least one of the plurality of mounting struts.

* * * * *